United States Patent [19]
Zingrone

[11] Patent Number: 5,491,923
[45] Date of Patent: Feb. 20, 1996

[54] FISHING POLE HOLDER

[76] Inventor: Thomas G. Zingrone, 901 N. Cold Spring Rd., Woodstock, Ill. 60098

[21] Appl. No.: 188,706

[22] Filed: Jan. 31, 1994

[51] Int. Cl.⁶ .................................................. A01K 97/12
[52] U.S. Cl. ........................... 43/17; 43/21.2; 248/538
[58] Field of Search .......................... 43/17, 21.2, 54.1, 43/56; 248/538, 534, 535, 539, 514

[56]  References Cited

U.S. PATENT DOCUMENTS

| | | | |
|---|---|---|---|
| D. 143,952 | 2/1946 | Curtis. | |
| 565,001 | 8/1896 | Horton | 43/21.2 |
| 2,137,645 | 11/1938 | Doench | 43/21.2 |
| 2,506,912 | 5/1950 | Augustine | 43/21.2 |
| 2,564,625 | 8/1951 | Jackson | 43/21.2 |
| 2,580,130 | 12/1951 | Rowdon | 43/21.2 |
| 2,621,877 | 12/1952 | Grigsby | 43/21.2 |
| 3,184,192 | 5/1965 | Hoerr | 248/538 |
| 3,311,332 | 3/1967 | Takus | 248/534 |
| 3,555,719 | 1/1971 | Butler | 43/21.2 |
| 3,603,019 | 9/1971 | Smeltzer | 43/21.2 |
| 3,659,369 | 5/1972 | Hermanson | 43/21.2 |
| 3,667,708 | 6/1972 | Smeltzer | 43/21.2 |
| 3,669,390 | 6/1972 | Nielson | 43/21.2 |
| 4,095,364 | 6/1978 | Prine | 43/21.2 |
| 4,603,500 | 8/1986 | Harrison | 43/21.2 |
| 4,845,881 | 7/1989 | Ward | 43/21.2 |
| 4,866,873 | 9/1989 | Van Valkenburg | 43/21.2 |
| 4,949,497 | 8/1990 | Lindell | 43/21.2 |
| 5,131,179 | 7/1992 | McEwen | 43/21.2 |
| 5,163,243 | 11/1992 | Wold, Jr. et al. | 43/21.2 |
| 5,335,440 | 8/1994 | Williams | 43/54.1 |

Primary Examiner—P. Austin Bradley
Assistant Examiner—Chuck Y. Mah
Attorney, Agent, or Firm—Anthony S. Zummer

[57]  ABSTRACT

The present invention is an improved fishing pole holder for use in ice fishing. The pole holder is movably mounted in an aperture in a bucket wall so that the pole may be held in an up attitude. A fish bites on bait connected to the fishing pole pulls the fishing pole into a pole down attitude to signal that a fish is on the line. The fishing pole holder includes an elongated beam which has a pole handle receptacle on one end and a pole support on the other end. The pole handle receptacle receives a handle from a fishing pole and the pole support holds up the rod portion of the pole. An elongated shaft is fixed to the beam. The shaft is pivotally mounted in the aperture. A stop is mounted on the shaft adjacent to one side of the wall, and a second stop is mounted on the shaft adjacent to the other side of the wall. A resilient compressive member is positioned adjacent to one side of the wall between the wall and one of the stops. The resilient compressive member is placed into a selected compressed state to apply a selected amount of force against the wall to determine the force required to rotate the shaft relative to the wall and thereby determine the force required to pivot the fishing pole to a pole down attitude.

16 Claims, 2 Drawing Sheets

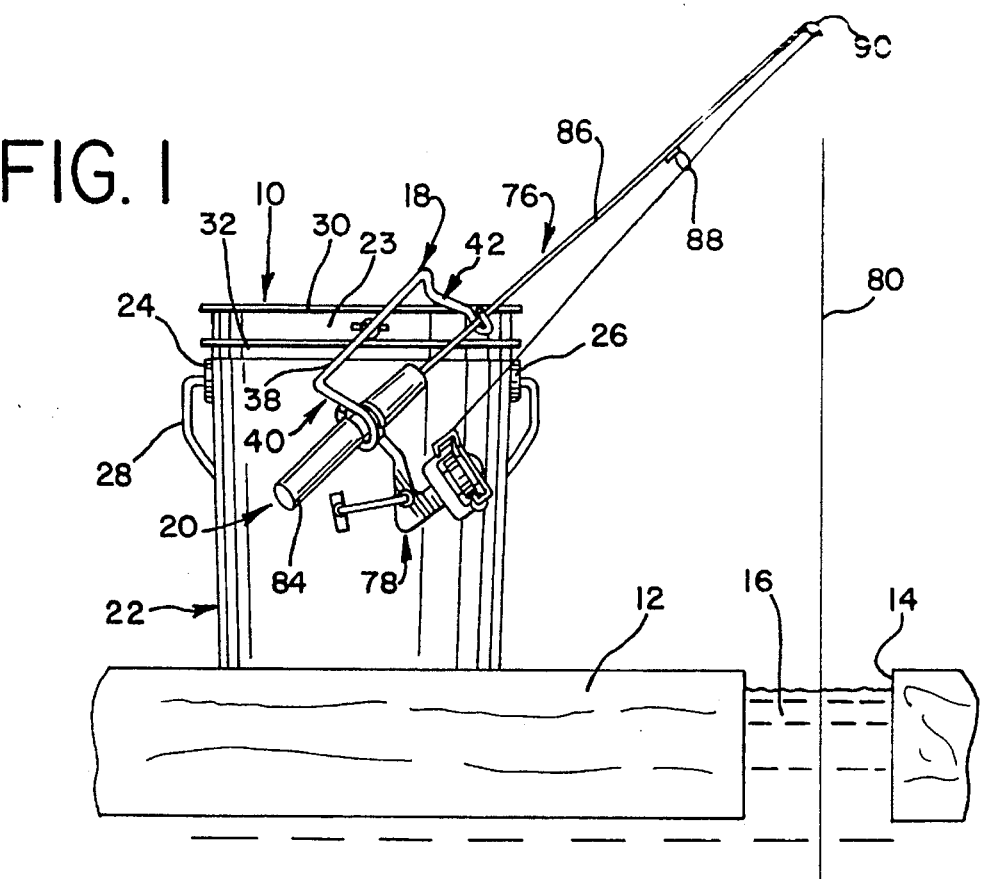
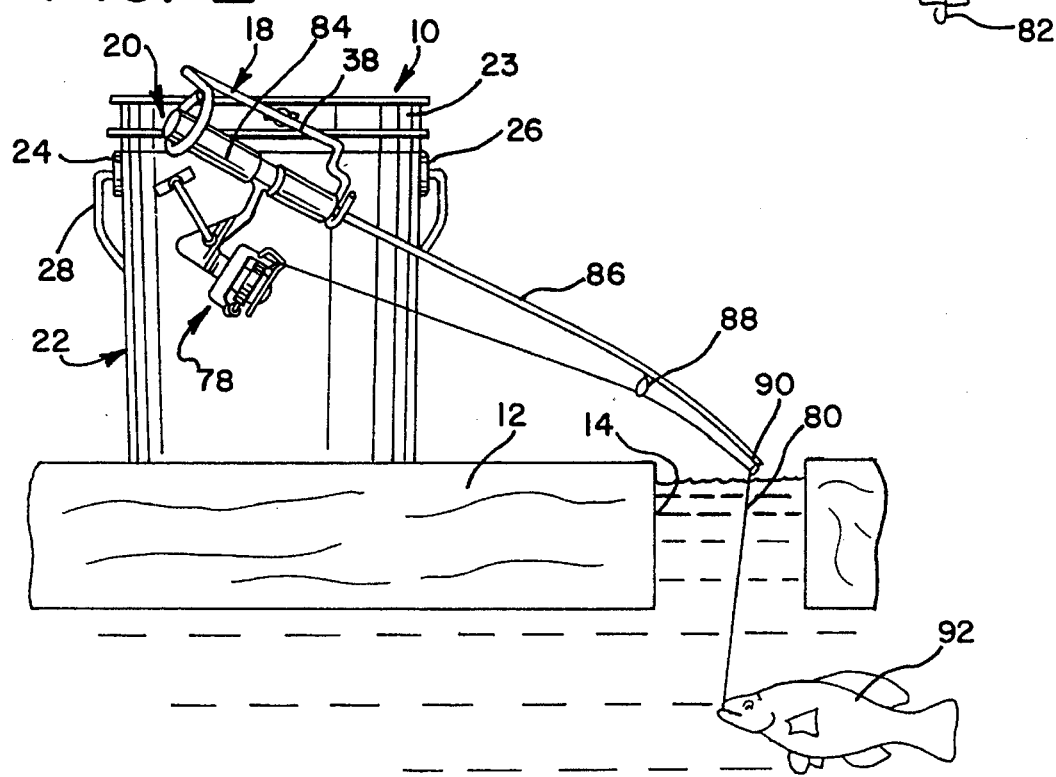

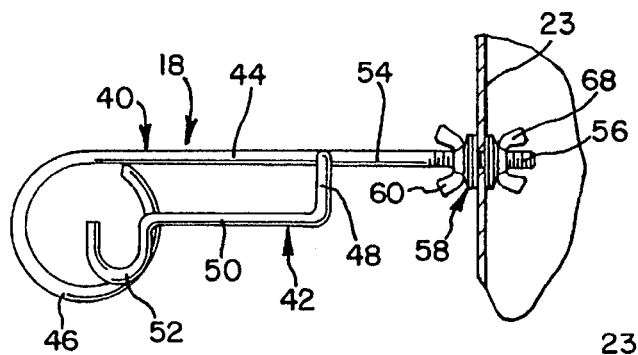
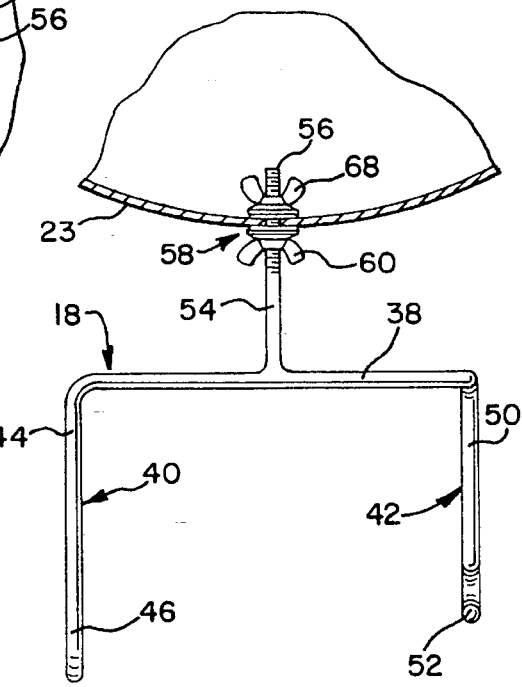
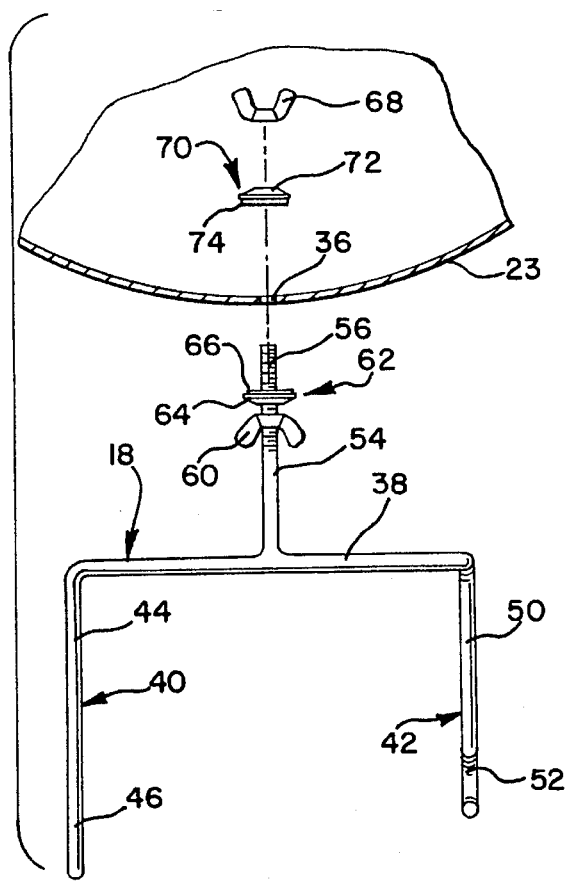
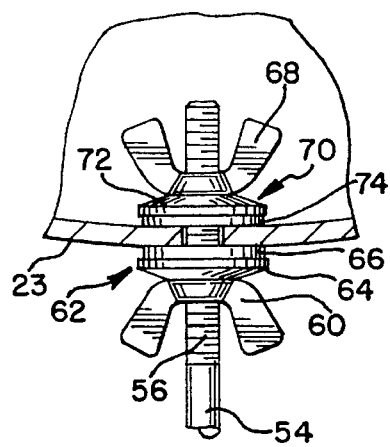

FISHING POLE HOLDER

BACKGROUND OF THE INVENTION

An ice fisherman typically makes a hole in ice covering a body of water. The ice fisherman positions a pole adjacent to the hole with a line in the water. Rather than stand in the cold and hold the fishing pole, many ice fishermen place the fishing pole in a holder so that they may wait for a bite in a protected area. A fishing pole holder for use in ice fishing may be mounted on any one of a plurality of supports. A commonly accepted support is a bucket.

There are a number of U.S. patents which teach various arrangements for supporting a fishing pole or fishing reel on a bucket. U.S. Pat. No. 5,131,179, issued Jul. 21, 1992, to McEwen, entitled, "Dual Fishing Pole Holders Attached To Portable Fish Bucket" discloses a fishing pole holder arrangement attached to a portable fishing bucket.

U.S. Pat. No. 4,949,497, issued Aug. 21, 1990, to Lindell, entitled, "Ice Fishing Device" teaches an ice fishing construction wherein a shaft with a reel mounted thereon is attached to a 5-gallon pail.

U.S. Pat. No. 4,845,881, issued Jul. 11, 1989, to Ward, entitled, "Fishing Apparatus" shows a fishing apparatus wherein a pole holder is secured to a container.

U.S. Pat. No. 3,667,708, issued Jun. 6, 1972, to Smeltzer, entitled, "Combination Fishing Rod and Flashlight Holder Attachment" teaches a fishing rod holder attached to a cylinder container.

U.S. Pat. No. 3,659,369, issued May 2, 1972, to Hermanson, entitled, "Fish Pole Holder" shows a fish pole holder which is mounted on the side and top of a minnow container.

U.S. Pat. No. 3,603,019, issued Sep. 7, 1971, to Smeltzer, entitled, "Combination Fishing Bucket" shows a fishing pole holder attached to a fishing bucket.

In addition to mounting fishing pole holders on a container or a bucket, it is well known to mount a fishing pole holder on a tackle box. U.S. Pat. No. 4,095,364, issued Jun. 20, 1978, to Prine, entitled, "Fishing Rod Holder For A Fishing Tackle Box" discloses a fishing rod holder which is mounted on the side of a tackle box.

U.S. Pat. No. 3,555,719, issued Jan. 19, 1971, to Butler, entitled, "Fishing Rod Holding Attachment For A Tackle Box" discloses a fishing rod holding attachment mounted on the top of a tackle box lid.

The concept of clamping a fishing rod holder to a support member is taught in a number of patents. U.S. Pat. Des. No. 143,952, issued, Feb. 26, 1946, to Curtis, entitled, "Fish Pole Holder" shows a fish pole holder with a clamp.

U.S. Pat. No. 2,580,130, issued Dec. 25, 1951, to Rowdon, entitled, "Fishing Reel Holder" shows a holder for a reel and a rod with a clamp for mounting the holder.

U.S. Pat. No. 2,564,625, issued Aug. 14, 1951, to Jackson, entitled, "Fishing Rod Holder" discloses a fishing rod holder which includes a clamp.

U.S. Pat. No. 565,001, issued Aug. 4, 1896, to Horton, entitled, "Fishpole Support" discloses a fishpole support with a fishing rod holder and a clamp for attaching the holder to a support.

The concept of providing a fishing pole holder which may be driven into a support surface is also well known. U.S. Pat. No. 4,866,873, issued Sep. 19, 1989, to Van Valkenburg, entitled, "Fishing Pole Holder Apparatus And Method" discloses a fishing pole holder which includes a stake member to be driven into the ground.

U.S. Pat. No. 2,506,912, issued May 9, 1950, to Augustine, entitled, "Fishing Rod Holder" discloses a fishing rod holder which includes a stake to be driven into the ground.

U.S. Pat. No. 2,137,645, issued Nov. 22, 1938, to Doench, entitled, "Supporting Bracket" shows a fishing rod holder with supporting legs.

The utilization of multiple fishing pole holders is taught in U.S. Pat. No. 4,603,500, issued Aug. 5, 1986, to Harrison, entitled, "Fishing Pole Holder".

The foregoing references fail to teach a construction for a fishing pole holder which allows an ice fisherman to observe from a distance that his fishing pole is in a pole down attitude which indicates that there is a fish on the line of his fishing pole. There are many devices which give a signal when there is a fish on the line. A typical device is U.S. Pat. No. 5,163,243, issued Nov. 17, 1992, to Wold et al, entitled, "Fishing Automatic Tip-Up." The tip up device does not utilize a fisherman's fishing pole.

It is an object of this invention to provide a fishing pole holder which may be readily used in ice fishing. The device provides a means to give an ice fisherman a signal that a fish is on the line of his pole.

SUMMARY OF THE INVENTION

The present invention relates to an improved fishing pole holder which is particularly adapted for mounting in an aperture in a wall of a container, such as, a bucket, for use in ice fishing. A fishing pole mounted in the holder will be pulled to a pole down attitude by a fish taking a bait connected to the fishing pole mounted in the holder. The instant pole holder includes, an elongated beam which is pivotally attached to a wall. A pole handle receptacle is connected to the beam for receiving a handle of a fishing pole. A pole support for receiving a portion of a fishing pole is connected to the beam and is spaced from the pole handle receptacle. An elongated shaft is fixed to the beam between the pole handle receptacle and the pole support. The shaft is pivotally mounted in the aperture to allow the beam to pivot relative to the wall. A stop is mounted on the shaft adjacent to one side of the wall. A second stop is mounted on the shaft adjacent to the other side of the wall. A resilient compressive member is positioned adjacent to the wall between the wall and one of the stops. The resilient compressive member is squeezed into a selected compressed state by positioning one stop relative to the other stop to determine the amount of force required to rotate the shaft relative to the wall to move the beam and a fishing pole connected to a beam from a pole up attitude to a pole down attitude.

BRIEF DESCRIPTION OF THE DRAWINGS

FIG. 1 is a side elevational view of a bucket positioned on a sheet of ice above water with a hole in the ice and a fishing pole holder embodying the herein disclosed invention mounted on the bucket with a fishing pole mounted thereon and having a line extending into the water;

FIG. 2 is a side elevational view similar to FIG. 1, but showing a fish hooked on the line and the fishing pole in a pole down attitude;

FIG. 3 is a side elevational view of the fishing pole holder of FIG. 1, but without the fishing pole and shown mounted on a portion of the bucket wall which bucket wall is shown in cross section;

FIG. 4 is a top elevational view of the fishing pole holder of FIG. 3 with the bucket wall shown in cross section;

FIG. 5 is an exploded view of the fishing pole holder of FIG. 4; and

FIG. 6 is an enlarged view of a portion of the fishing bucket of FIG. 4 and showing a mounting portion of the fishing pole holder positioned in an aperture in the fishing bucket wall.

DESCRIPTION OF THE PREFERRED EMBODIMENT

Referring now to the drawings and especially to FIG. 1, a bucket generally indicated by numeral 10 is shown positioned on a sheet of ice 12. A hole 14 in the ice exposes water 16. The bucket 10 has a fishing pole holder 18, embodying the herein disclosed invention, mounted thereon. A conventional and well known fishing pole assembly 20 is removably mounted in fishing pole holder 18.

In this instance, bucket 10 is a conventional molded plastic vessel 22 which has a conventional side wall 23. A pair of opposed bail bosses 24 and 26 is mounted on side wall 23 near the top of the vessel. A conventional bail 28 is conventionally pivotally mounted in bosses 24 and 26. In this instance, vessel 22 includes an upper ring 30 and a parallel lower ring 32. The rings 30 and 32 are formed integral with side wall 23. As may be best seen in FIG. 5, wall 23 has a fishing pole holder mounting aperture 36 extending through the wall to receive a portion of fishing pole holder 18.

Fishing pole holder 18 generally includes an elongated beam 38 with a pole handle receptacle 40 formed on one end of the beam and a pole support 42 formed integral with the other end of the beam. Pole receptacle 40 includes a receptacle arm 44 which has one end formed integral with beam 38. The other end of the arm 44 has a receptacle eye 46 formed integrally therewith. The receptacle eye is particularly adapted to receive a handle of a fishing pole. Pole support 42 includes a support post 48 which is formed integral with beam 38 and is perpendicular to the beam. A support arm 50 is formed integral with post 48 and is perpendicular to post 48 so that support arm 50 is parallel to receptacle arm 44. A U-shaped pole support 52 is formed integral with support arm 50 and is substantially aligned with receptacle eye 46, as may be best seen in FIG. 3.

Fishing pole holder 18 includes an elongated shaft 54 which is fixed to beam 38 midway between the pole handle receptacle and the pole support. As may be best seen in FIGS. 3 and 5, shaft 54 is perpendicular to beam 38 and is parallel to receptacle arm 44 and to support arm 50. Shaft 54 has a threaded portion or shank 56 formed integral with the free end of the shaft.

A retention assembly 58 is mounted on the end of threaded shaft 56 for selectively retaining the holder in a selected attitude with a fishing pole mounted therein. The retention assembly 58 includes a conventional wing nut 60 threadedly mounted on threaded portion 56. Wing nut 60 acts as a stop on the threaded portion. A washer 62 is movably mounted on the threaded portion 56 between wing nut 60 and the exterior of wall 23, as may be best seen in FIG. 6. Washer 62 includes a rigid body 64 having an aperture to receive the threaded shaft. A resilient compressive disk member 66 is fixed to rigid body 64 and is movably mounted on the threaded portion 56. Disk member 66 is positioned in engagement with the exterior of wall 23 between wing nut 60 and wall 23. A second wing nut 68, identical to wing nut 60, is threadedly mounted on threaded portion 56. Wing nut 68 acts as a second stop on the threaded portion. A washer 70, identical to washer 62, is movably mounted on the threaded portion between wing nut 68 and the interior of wall 23. Washer 70 includes a rigid body 72 and a resilient compressive disk member 74. The resilient compressive disk member 74 is movably mounted on the threaded portion and is positioned against the interior surface of wall 23 between the wall and wing nut 68. Resilient compressive disk members 66 and 74 are, in this instance, made of a resilient rubber material, which is not subject to a substantial loss of compressibility and resilience due to low temperatures as low as −20° F.

Fishing pole assembly 20 includes a conventional fishing pole 76, a conventional fishing line reel 78, a conventional line 80, and a conventional fishhook 82. Fishing pole 76 includes a conventional handle 84 which is removably mounted in receptacle eye 46. The fishing reel 78, which in this instance is shown as a spinning reel, is mounted on handle 84 and limits the movement of handle 84 through receptacle eye 46. The fishing pole includes a conventional rod 86 fixed to the handle and removably positioned in U-shaped support 52. The rod, in this instance, has an eyelet 88 and a conventional tip 90 on the free end of the rod. Line 80 extends from reel 78 through eyelet 88 and tip 90 into hole 14 and water 16. In FIG. 1, fishhook 82 is shown in the water with a bait 91 shown thereon. The bait is conventional and well known to those skilled in the art.

Fishing pole holder 18 is pivotally mounted on bucket 10. Wing nut 60 and washer 62 with disk member 66 are mounted on threaded portion 56. Threaded portion 56 is then inserted into aperture 36 of wall 23. Washer 70 is then mounted onto threaded portion 56 along with wing nut 68, which acts as a stop. Wing nut 68 is moved along the threaded portion to place resilient disk member 74 into engagement with the interior of wall 23. Wing nut 60 acts as a stop and holds the resilient compressive member 66 into engagement with the exterior of wall 23. Fishing pole assembly 20 is positioned in the fishing pole holder. A sufficient amount of line is drawn from the reel to place the fishhook 82 at a selected depth in the water. The wing nuts 60 and 68 are appropriately tightened to hold the fishing pole 76 in a pole up attitude, that is, such as that shown in FIG. 1. The wing nuts are not tightened excessively, but rather tightened sufficiently to hold the pole in the up attitude, but sufficiently loose so that the pole may be shifted to a pole down attitude, such as that shown in FIG. 2. When a fish, such as, fish 92, takes bait on fishhook 82, the fish tugs on line 80 to apply force to tip 90 and thereby pull the pole to a pole down attitude, such as that shown in FIG. 2.

Fishing pole holder 18 provides a convenient and simple method for an ice fishermen to observe his fishing pole from a distance and to observe when there is a fish on his line. The ice fishermen simply adjusts the fishing pole holder in the up attitude, such as that shown in FIG. 1. The ice fishermen may then go to a sheltered area or to the interior of a vehicle. When fish 92 takes the bait on fishhook 82, the fish taking the bait pulls the pole down to a pole down attitude, as shown in FIG. 2. The fishermen may readily observe that he has a fish on his line 80 and move from his shelter to the fishing pole where he may quickly remove the fishing pole from the fishing pole holder and reel in his fish. The bucket provides a convenient receptacle for holding the fish after it has been removed from fishhook 82.

Although the instant invention has been described in detail in order to disclose the inventor's best mode of practicing the invention, it is readily apparent that those skilled in the art may make various modifications and changes in the present invention without departing from the spirit and scope of the present invention. It is to be expressly understood that the scope of this invention is limited only by the appended claims.

What is claimed is:

1. A fishing pole holder mounted in an aperture in a wall of a bucket and being selectively movable to a pole down attitude by a fish biting on a bait connected to the fishing pole holder through a line and a fishing pole mounted in the fishing pole holder comprising: an elongated beam, a pole handle receptacle connected to the beam for receiving a handle of a fishing pole, a pole support connected to the beam and spaced from the pole handle receptacle, said pole support adapted to receive a portion of a fishing pole mounted in the pole handle receptacle, an elongated shaft fixed to the beam between the pole handle receptacle and the pole support, a bucket having a wall with a aperture in the wall, said shaft being pivotly positioned in the aperture in the wall to allow the beam to pivot relative to the wall, a stop mounted on the shaft adjacent to one side of the wall, a second stop mounted on the shaft adjacent to the other side of the wall, and a resilient compressive member positioned adjacent to one side of the wall between the wall and one of said stops, whereby the resilient compressive member is placed into a selected compressed state relative to the wall by positioning one stop relative to the other stop to determine the amount of force required to rotate the shaft relative to the wall to move the beam and a fishing pole connected to the beam to a pole down attitude.

2. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, wherein the first mentioned resilient compressive member is positioned between the one side of the wall and the first mentioned stop, and a second resilient compressive member positioned adjacent to the other side of the wall between the wall and the second stop.

3. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, including, a washer having a substantially rigid body mounted on the shaft, and the resilient compressive member is a disk mounted on the rigid body between the rigid body and the wall.

4. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, including, a washer including a rigid body movably mounted on the shaft, the resilient compressive member being a disk movably mounted on the shaft and fixed to the rigid body adjacent to the wall, and a second washer movably mounted on the shaft between the second stop and the wall, said second washer having a second rigid body movably mounted on the shaft, and a second resilient compressive disk mounted on the second rigid body between the second rigid body and the wall.

5. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, said shaft including a threaded shank movably mounted in the aperture, said stops being threadedly mounted on the threaded shank.

6. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, including, a threaded shank formed on the shaft and being movably mounted in the aperture, one of said stops is a nut threadedly mounted on the threaded shank for moving the nut along the threaded shank to determine the compressed state of the resilient compressible member to determine the amount of force applied against the wall to resist rotation of the shaft relative to the wall.

7. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, including, a threaded shank formed on the shaft and being movably mounted in the aperture, one of said stops being a nut threadedly mounted on the threaded shank, the second stop being a second nut threadedly mounted on the threaded shank, whereby the compressed state of the resilient compressive member applying a force against the wall is determined by the position of the nuts relative to each other.

8. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, wherein the pole handle receptacle includes a receptacle arm having one end fixed to the beam and a pole handle receptacle eye mounted on the other end of the receptacle arm for receiving the handle of a fishing pole.

9. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, wherein the pole support includes, a support post, a support arm substantially perpendicular to the support post, and a U-shaped pole holder for receiving a portion of a fishing pole.

10. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, said shaft including a threaded shank movably mounted in the aperture, said stops being threadedly mounted on the threaded shank, each of said stops being a nut, including, a washer mounted on the threaded shank, said washer having a substantially rigid body connected to the resilient compressive member, said resilient compressive member being a disk between the rigid body and the wall.

11. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, said shaft including a threaded shank movably mounted in the aperture, each of said stops being a wing nut threadedly mounted on the threaded shank, a washer including a rigid body movably mounted on the threaded shank, the resilient compressive member being a disk movably mounted on the threaded shank and fixed to the rigid body adjacent to the wall, a second washer movably mounted on the threaded shank between the second stop and the wall, said second washer having a second rigid body movably mounted on the threaded shank, and a second resilient compressive disk movably mounted on the threaded shank and being substantially fixed to the second rigid body between the second rigid body and the wall.

12. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, wherein the pole handle receptacle includes a receptacle arm having one end fixed to the beam and a pole handle receptacle eye mounted on the other end of the receptacle arm for receiving the handle of a fishing pole, said pole support includes, a support post, a support arm substantially perpendicular to the support post, and a U-shaped pole holder for receiving a portion of a fishing pole having its handle positioned in the pole handle receptacle eye.

13. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, said shaft including a threaded shank movably mounted in the aperture, each of said stops being a nut threadedly mounted on the threaded shank, a washer mounted on the threaded shank, said washer having a substantially rigid body connected to the resilient compressive member, said resilient compressive member being a disk positioned between the rigid body and the wall, said pole handle receptacle including, a receptacle arm having one end fixed to the beam, and a pole holder receptacle eye mounted on the other end of the receptacle arm for receiving the handle of a fishing pole.

14. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, wherein the pole support includes, a support post, a support post arm substantially perpendicular to the support post, and a U-shaped pole holder for receiving a portion of a fishing pole having its handle mounted in the pole receptacle, a threaded shank formed on the shaft and being rotatably mounted in the aperture, each of said stops being a nut threadedly mounted on the threaded shank, a washer having a substantially rigid body connected to the resilient compressive member, said resilient compressive member being a disk fixed to the rigid body and positioned between the rigid body and the wall.

15. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, including, a threaded shank formed integral with said shaft and being movably mounted in the aperture, each of said stops being a nut threadedly mounted on the threaded shank, a washer having a substantially rigid body movably mounted on the threaded shank, said resilient compressive member being a disk mounted on the rigid body between the rigid body and the wall, a pole handle receptacle includes a receptacle arm having one end fixed to the beam and a pole handle receptacle eye mounted on the other end of the receptacle arm for receiving the handle of a fishing pole, said pole support includes, a support post, a support arm substantially perpendicular to the support post, and a U-shaped pole holder for receiving a portion of a fishing pole having its handle mounted in the receptacle eye.

16. A fishing pole holder mounted in an aperture in a wall of a bucket and being selectively movable to a pole down attitude by a fish biting on a bait connected to the fishing pole holder through a line and a fishing pole mounted in the fishing pole holder as defined in claim 1, including, a threaded shank formed integral with said shaft and being rotatably mounted in the aperture, each of said stops being a wing nut threadedly mounted on the threaded shank, a washer including a rigid body movably mounted on the threaded shank, the resilient compressive member being a disk movably mounted on the threaded shank and fixed to the rigid body between a rigid body and the wall, a second washer movably mounted on the threaded shank between the second stop and the wall, said second washer having a second rigid body movably mounted on the threaded shank, a second resilient compressive member being a disk movably mounted on the threaded shank and being fixed to the second rigid body between the second rigid body and the wall, said pole support including, a support arm, a support post substantially perpendicular to the support arm, and a U-shaped pole holder for receiving a portion of a fishing pole, and said pole handle receptacle includes a receptacle arm having one end fixed to the beam and a pole handle receptacle eye mounted on the other end of the receptacle arm for receiving the handle of the fishing pole positioned in the U-shaped pole holder.

* * * * *